United States Patent [19]

Smith

[11] Patent Number: 5,372,505
[45] Date of Patent: Dec. 13, 1994

[54] VEHICLE SIMULATOR

[76] Inventor: David Smith, 3717 Barrington Bridge Pl., Richmond, Va. 23233

[21] Appl. No.: 825,633

[22] Filed: Jan. 24, 1992

[51] Int. Cl.$^5$ ............................................. B61H 1/00
[52] U.S. Cl. ................................................... 434/67
[58] Field of Search ...................... 434/62; 128/32, 33, 128/35-37; 297/330; 472/34, 42, 12, 14, 26, 31; 601/24, 49-54, 56-62; 280/1.175, 1.177, 1.181, 1.182-1.184

[56] References Cited

U.S. PATENT DOCUMENTS

| | | | |
|---|---|---|---|
| 1,521,790 | 5/1922 | Prescott . | |
| 1,709,410 | 1/1927 | Simmons . | |
| 1,797,306 | 12/1927 | Webb . | |
| 1,984,397 | 11/1931 | Dalyze | 128/33 |
| 2,696,207 | 12/1954 | Bushwell | 128/33 |
| 2,821,191 | 1/1958 | Pall | 128/33 |
| 3,037,499 | 11/1959 | Cummins | 128/33 |
| 3,330,523 | 7/1967 | Nichols | 297/330 |
| 4,455,000 | 6/1984 | Foster et al. . | |
| 4,464,117 | 8/1984 | Foerst | 434/67 |
| 4,858,599 | 8/1989 | Halpern | 128/33 |
| 4,969,684 | 11/1990 | Zarotti | 128/33 X |
| 5,088,473 | 2/1992 | Chen et al. | 128/33 X |

OTHER PUBLICATIONS

Wilder, David G. et al., "Vibration and the Human Spine," *Spine*, vol. 7, No. 3, 1982, pp. 243-254.
"Truck Seat Vibration Simulator" by Monitech, Inc.
Brochure entitled "Truck Seat Vibration Simulator" by Monitech, Inc.
"Vibration Simulator For Vehicle Operators In Work Simulation Programs" by Monitech, Inc.
"Seat Vibration Simulator Improved On Latest Model", *Advance for Physical Therapists*, Jan. 27, 1992, p. 42.
Brochure for Challenger, by Milsco Manufacturing Company.

Primary Examiner—Richard J. Apley
Assistant Examiner—Glenn E. Richman
Attorney, Agent, or Firm—Tilton, Fallon, Lungmus & Chestnut

[57] ABSTRACT

A vehicle simulator includes a base member, a seat member pivotally connected to the base member, a rotatable follower connected to the seat member, and a driving device rotatably mounted proximate the follower for engaging the follower and displacing the follower between predetermined limits at predetermined time intervals. The seat member displaces or vibrates in response to the movement of the follower which the driving device displaces.

11 Claims, 4 Drawing Sheets

Fig. 1
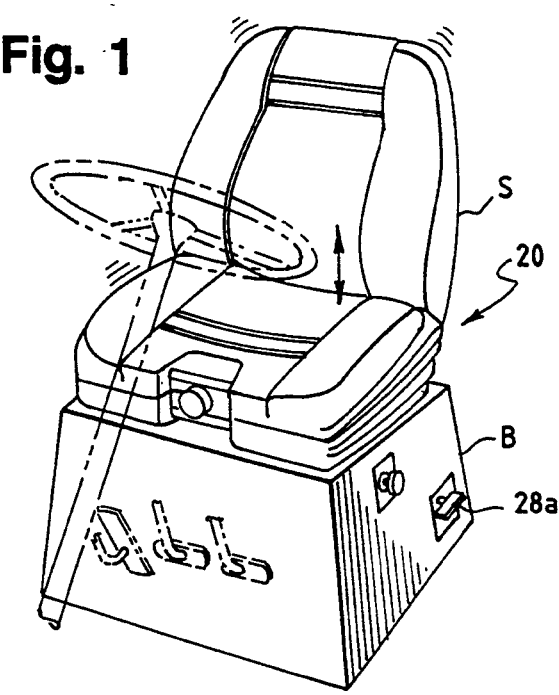
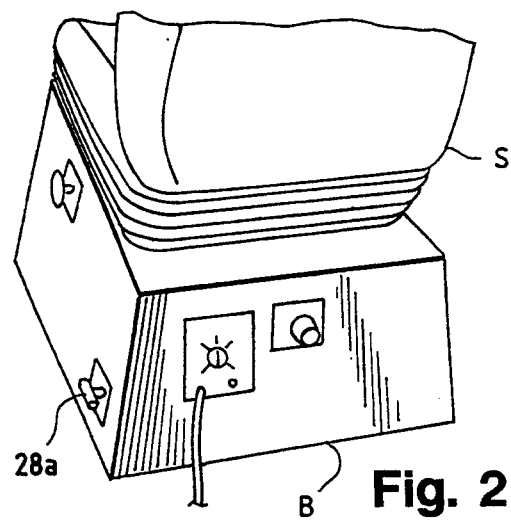
Fig. 2
Fig. 3
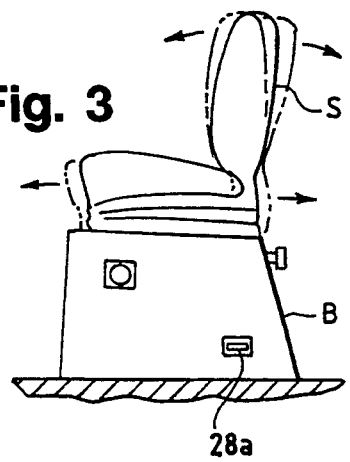
Fig. 4
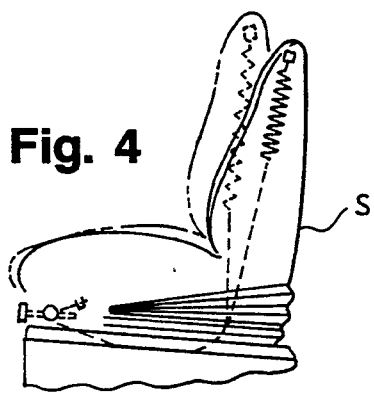
Fig. 5A
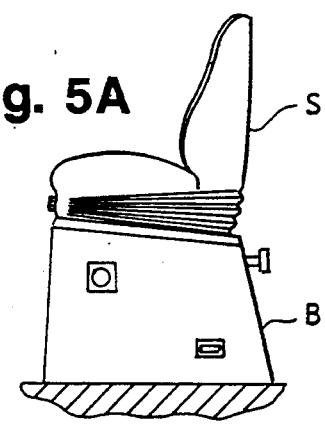
Fig. 5B
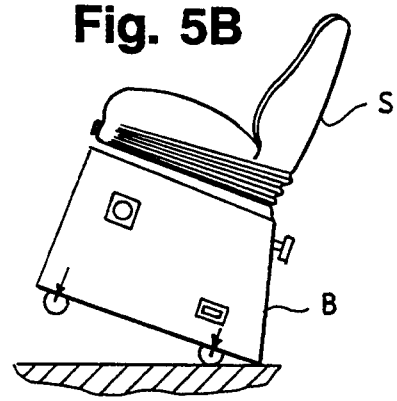
Fig. 5C
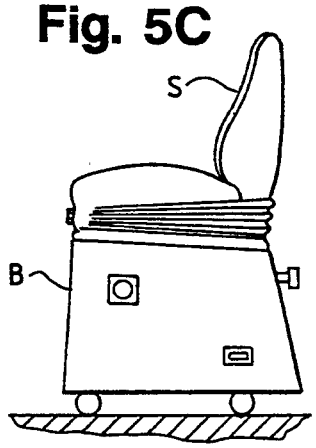
Fig. 5D
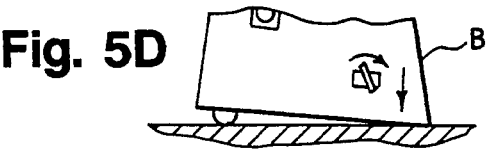
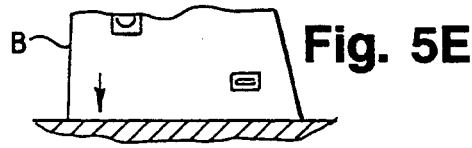
Fig. 5E

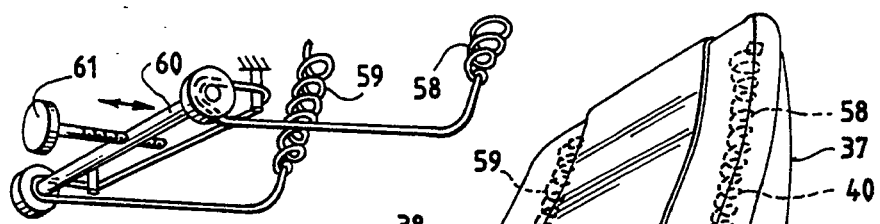
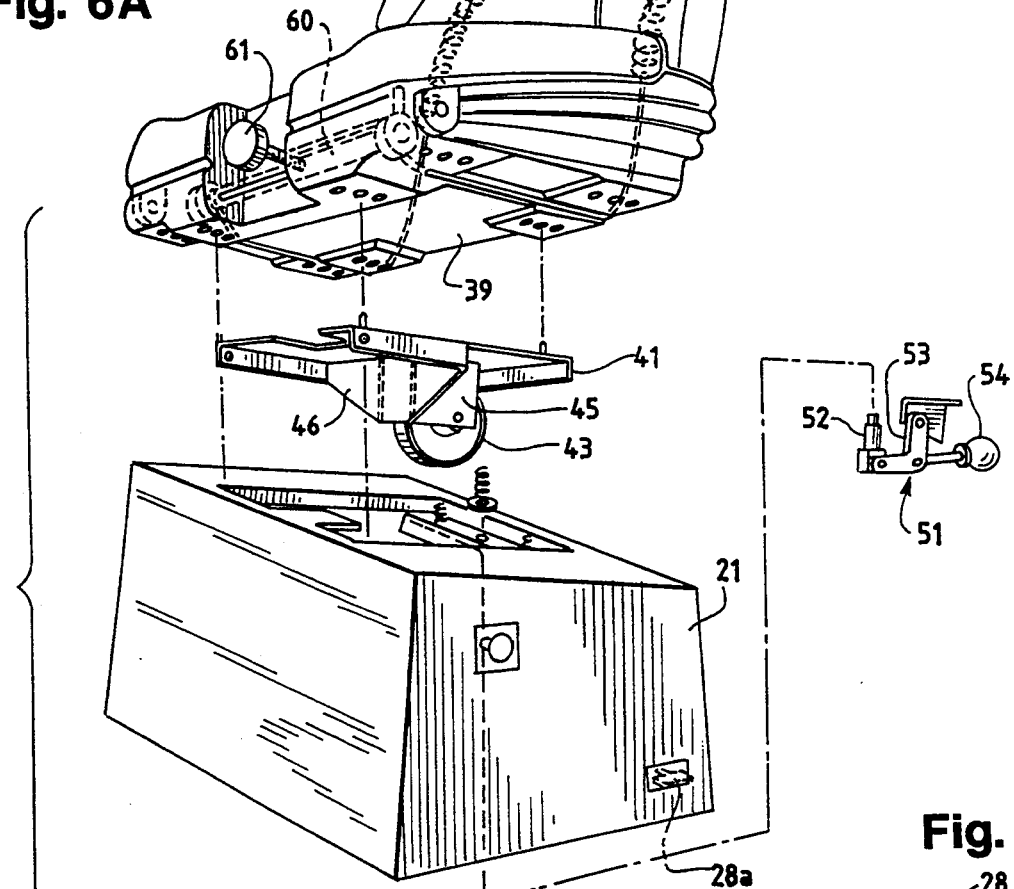
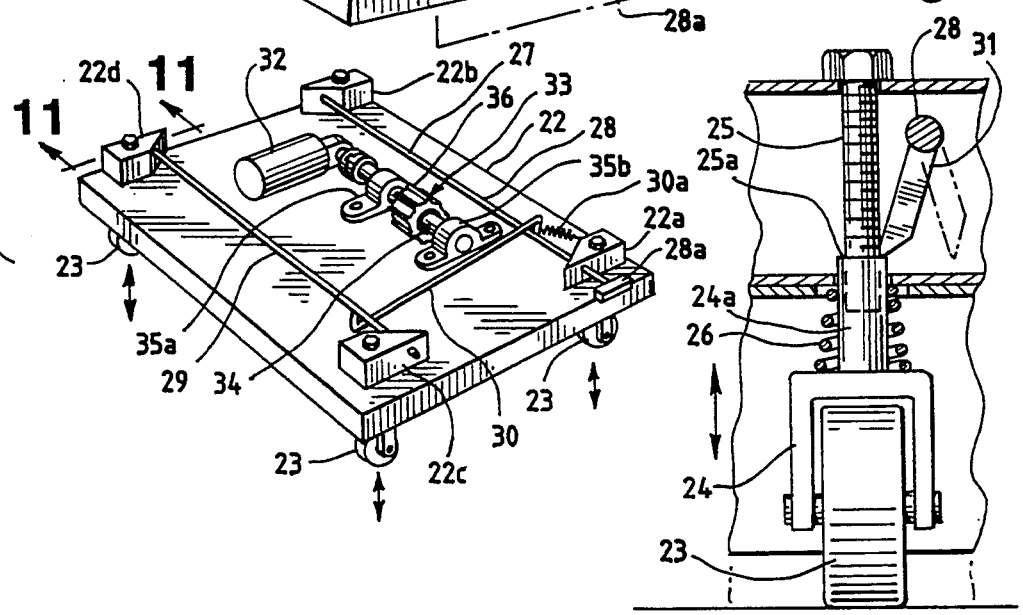
Fig. 6
Fig. 6A
Fig. 7

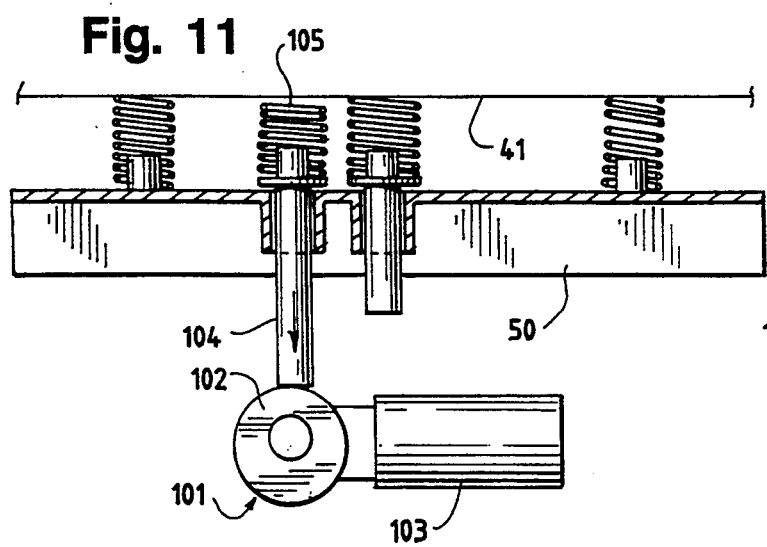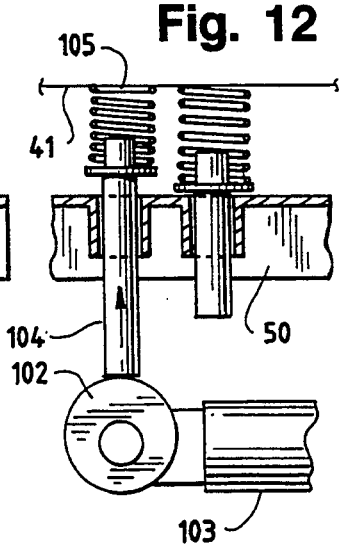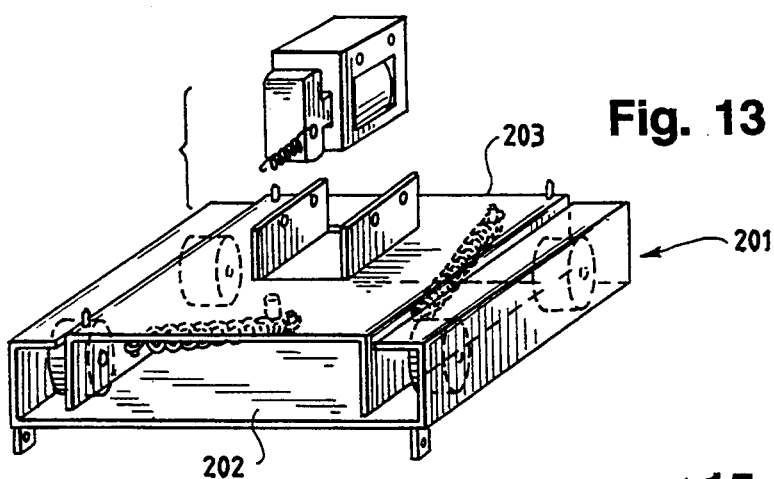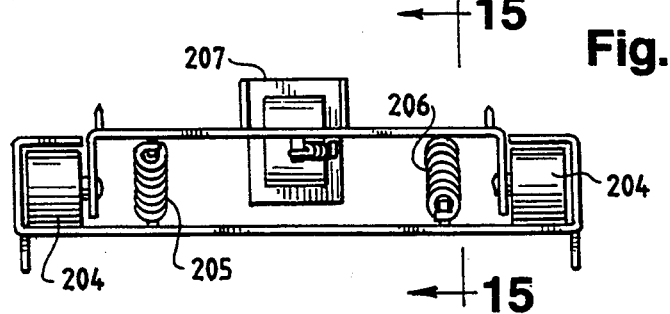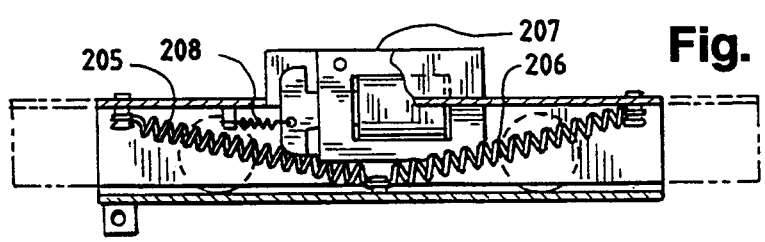

VEHICLE SIMULATOR

BACKGROUND AND SUMMARY OF THE INVENTION

The present invention generally relates to a vehicle simulator, and more particularly, to a vehicle simulator which includes a seat member and a rotating driving mechanism which displaces the seat and accurately simulates a vehicle's movements.

A vehicle simulator used for therapeutic, instructional, or other purposes should meet the following requirements: First, the simulator must accurately simulate the cushioning provided by a seat of a vehicle. Second, it must accurately simulate a vehicle's vibrations and other movements. Third, it must have a construction which allows easy manufacture, operation, and adjustment. Finally, the simulator must maximize reliability and minimize the cost of manufacture.

The simulator apparatus of the present invention meets the requirements outlined above. It accurately reproduces vehicle vibrations and other movements. It is a simple apparatus which minimizes the expense of manufacture and gives precise, uniform and reliable performance. This simulator apparatus produces the requisite mechanical action to accurately simulate vehicle movements and transmit them to a user or the apparatus.

In accordance with one embodiment of the present invention, a vehicle simulator includes a base member, a seat member pivotally connected to the base member, a rotatable follower connected to the seat member, and a driving device rotatably mounted proximate the follower for engaging the follower and displacing the follower between predetermined limits at predetermined time intervals. The seat member displaces in response to the movement of the follower which the driving device displaces.

BRIEF DESCRIPTION OF THE DRAWINGS

For a more complete understanding of this invention, one should now refer to the embodiment and modifications illustrated in greater detail in the accompanying drawings and described below by way of an example of the invention. In the drawings:

FIG. 1 is a perspective view of an embodiment of the vehicle simulator of the present invention;

FIG. 2 is a partial perspective view of the back of the simulator shown in FIG. 1;

FIG. 3 is a side elevation view of the simulator of FIG. 1;

FIG. 4 is a side elevation view of the simulator of FIG. 1, showing an internal spring assembly for the seat of the simulator;

FIGS. 5A–5E are side elevation views of the simulator of FIG. 1, showing the sequence of engaging and disengaging the simulator casters;

FIG. 6 is an exploded perspective view of the simulator shown in FIG. 1;

FIG. 6A is a perspective view of the spring assembly disposed in the simulator seat;

FIG. 7 is a side elevation view of a caster of the simulator of FIG. 1;

FIG. 11 is the sectional view of FIG. 9, showing a modification of the seat displacing assembly of the simulator including a cam operated driving rod and spring;

FIG. 12 is a sectional view showing the modification of FIG. 11 with the spring engaging the seat of the simulator;

FIG. 13 is a perspective view of a modified plate for the bottom of the simulator seat;

FIG. 14 is a front elevation view of the modification of FIG. 13;

FIG. 15 is a sectional view taken along line 15—15 in FIG. 14.

Figure 8:
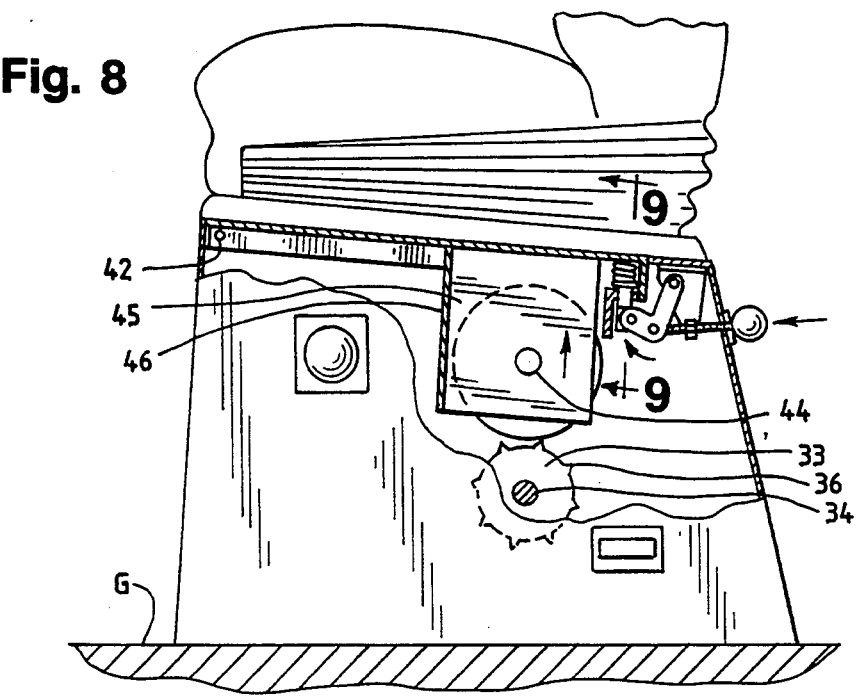
FIG. 8 is an enlarged, side elevation view with the base of the simulator partially cut away to show the driving and following wheels of the simulator.

While the applicant will describe the invention in connection with an embodiment, one should understand that the invention is not limited to this embodiment. Furthermore, one should understand that the drawings are not to scale and that graphic symbols, diagrammatic representations and fragmentary views may illustrate the embodiment. In certain instances, the applicant may have omitted details which are not necessary for an understanding of the present invention such as conventional details of fabrication and assembly.

DETAILED DESCRIPTION OF THE DRAWINGS AND AN EMBODIMENT

Turning now to the drawings, FIGS. 1–4 illustrate the vehicle simulator of the present invention at 20. The simulator generally includes a seat member S and a base member B. The base member B supports the seat member S at a predetermined elevation so that a user of the simulator may operate the steering wheel, and the brake and accelerator pedal arrangement (shown in phantom in FIG. 1) with which the seat and base member cooperate.

The base member B includes a box-like housing 21 made of sheet metal or any other material of sufficient strength and rigidity. This housing 21 includes a bottom plate 22 (See FIG. 6) to which four caster mounting assemblies (See FIG. 7) mount four casters 23, one caster at each of the four corners of the plate. Each mounting assembly includes a yoke 24 with a tube 24a, a bolt 25 threaded into a threaded central opening of the tube 24a, and a spring 26 disposed around the bolt 25 between the yoke 24 and the bottom plate 22. The bolt 25 extends through openings in the bottom plate 22 in sliding engagement with the plate; and the spring 26 biases the caster 23 to the position shown in FIG. 7. However, the weight of the base member B and the seat member S can overcome the force of the spring 26.

To lock the casters 23 in the position shown in FIG. 7, the base member B includes a locking assembly 27, including pivotable rods 28 and 29, and a linkage 30 with a biasing spring 30a. Four blocks 22a, 22b, 22c and 22d mount the rods 28 and 29 to the plate 22 and provide bearing surfaces for the rods 28 and 29. The locking assembly 27 also includes a latch 31 for each caster 23 (one latch secured at each end of the rods 28 and 29). The linkage 30 and biasing spring 30a bias each latch 31 to the position shown in FIG. 7. In that position, each latch 31 engages a step 25a defined by the bolt 25 and the tube 24a of the corresponding caster mounting assembly and locks the caster 23 in the operable position shown.

Using a handle 28a, an operator may rotate the rod 28, driving the linkage 30 and accordingly rotating the rod 29. In this manner the operator may disengage the latches 31. FIGS. 5A-5E show a sequence of movements for engaging the casters 24. In this sequence, FIG. 5B shows how one must tilt the simulator to allow the casters to move to the position shown in FIG. 7. The springs 26 move the casters downwardly and the spring 30a moves the latch 31 clockwise.

The bottom plate 22 supports a motor 32 and a rotatable cam wheel 33 mounted to the plate 22 using a shaft 34 and two pillow block bearings 35a and 35b. The motor drives the shaft 34 (on which the wheel 33 lies fixedly secured); and accordingly it rotates the wheel 33 to displace or vibrate the seat member S (as described below). The wheel 33 is a round metal member (or a member made out of any other suitable material, e.g., hard plastic) with a plurality of elongate protrusions or lobes 36 formed by welding a rod or a bead, axially along the face of the wheel. (Alternatively, the lobes and the remaining portion of the wheel may be one integrally formed member.) Preferably, the lobes lie spaced apart at equal distances around the wheel. However, they may also lie at unevenly spaced intervals around the wheel.

The seat member S is an assembly manufactured by MILSCO MFG. Co., Milwaukee, Wis. 53223 and identified as Model No. Challenger J0100. It includes an adjustable back rest portion 37 (See FIG. 6), a seat portion 38, and an internal frame (not shown). The seat bottom 39 is a metal plate or a plate made of any other material of high strength and rigidity (e.g., hard plastic). A flexible covering made of cloth, leather or any one of a wide variety of synthetic materials forms the outer shell of the remaining portions of the seat member S and conventional cushions fill the inside of the seat member S. The seat member S also contains a spring assembly 40 which biases the seat member upwardly as described below.

A plate 41 bolted or otherwise fixedly secured to the seat bottom 39 pivotally connects the seat member S to the base member B. Suitable pivot connections pivotally connect the front of the plate 41 to the base member B. As shown in FIG. 6, the plate 41 extends across an opening at the top of the base member B. The plate's pivot axis 42 lies generally parallel to the supporting surface G (See FIG. 8) and across the front of the plate 41 and the simulator 20.

In addition to the function identified above, the plate 41 supports a follower wheel 43 which lies below the plate 41 for rotation about an axis 44. The wheel 43 freely rotates between a first plate 45 and a second plate (not shown) which mount it to the plate 41. (A cross plate 46 braces the two plates.) This wheel 43 extends into the base member B through the opening at the top of the member B, engages the cam wheel 33, and follows it, bouncing or vibrating as a result of contact with the lobes of the cam wheel 33. Accordingly, the seat member S vibrates.

The frequency of vibration is a function of the speed of the motor which drives the cam wheel 33 and the number of lobes on the cam wheel. Studies have shown that motor vehicles have a primary vibration frequency in the range of about 3 to 9 Hz. A more common frequency range is 3 to 6 Hz. (Wilder D., Woodworth B., Frymoyer J., Pope M., Vibration and the Human Spine, Spine 7:243-254, 1982). The controls of the motor 32 provide a frequency of vibration of between 3 and 9 Hz, and more preferably between 3 and 6 Hz.

Figure 9:
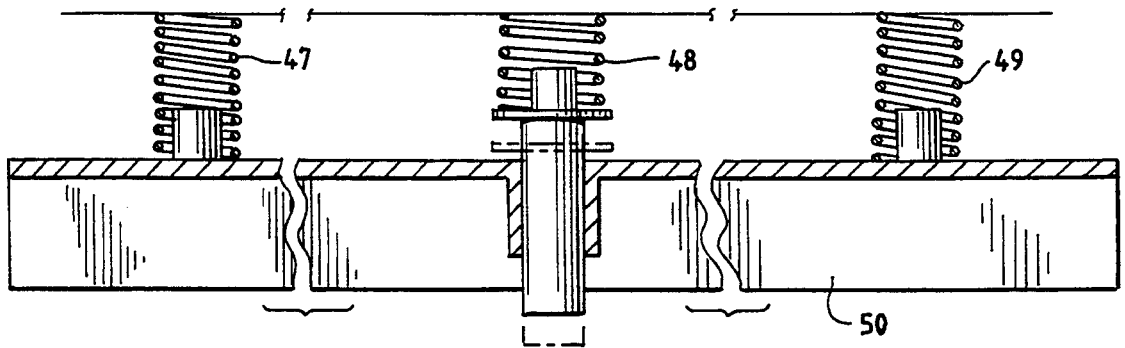
FIG. 9 is a sectional view taken along line 9—9 in FIG. 8.

A suspension assembly including springs 47, 48 and 49 cushions the contact between the cam wheel 33 and the follower wheel 43 and improves the quality of vibration of the seat member (See FIG. 9). A bar 50 which extends across the top portion of the base member B between the sidewalls of the member B supports the springs proximate the opening at the top of the base member B. The springs contact the bottom of the plate before the follower wheel 43 engages the cam wheel 33.

Figure 10:
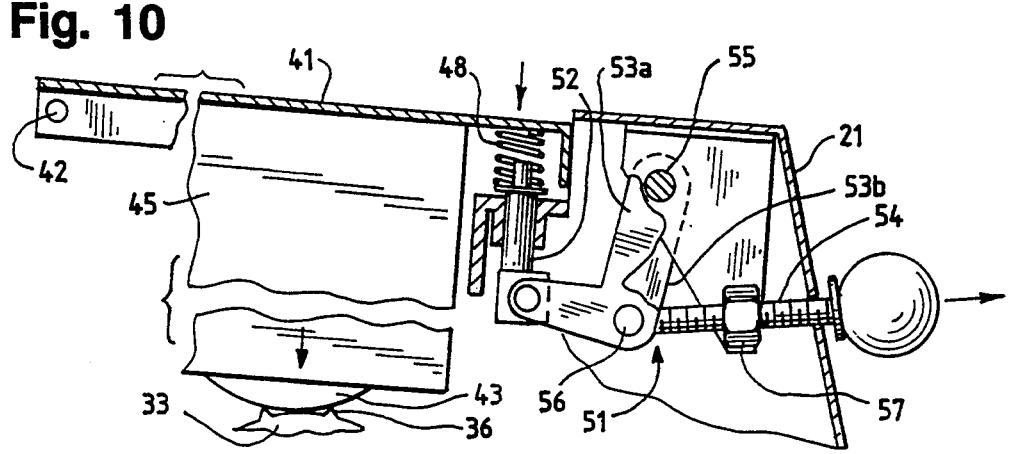
FIG. 10 is an enlarged view of the adjusting assembly shown in FIG. 8.

A load adjusting assembly 51, including a plunger 52, two link arms 53a and 53b and an adjusting handle 54, adjusts the cushioning of the suspension assembly by raising and lowering the middle spring 48 and thus increasing and decreasing the force against the bottom of the plate 41 (See FIG. 10). (CLAMP MFG. CO., S. Elmonte, Calif. 91733 manufactures the assembly 51 without the plunger 52 and identifies it as Model No. 411-2). The assembly 51 adjusts the vibration imparted by the cam wheel 33 to the seat member S. It may even lift the follower wheel 43 out of contact with the cam wheel 33. The link arms 53a and 53b have one end pivotally connected, with a mounting bracket, to the wall of the base member housing 21 as at 55 and the other end to the bottom of the plunger 52. They have their middle elbow portions connected by an axle 56 which the handle 54 drives. An operator moves the link arms inward of the base member B by threading the handle 54 through a yoke (fixedly secured to the mounting bracket) and driving the axle 56, thus, raising the plunger 52. Outward movement of the handle 52 lowers the plunger.

The spring assembly 40 (disposed in the seat member S, See FIG. 6) biases the back portion of the seat member S upwardly or away from the base member B and supplements the suspension system described above. It includes a pair of springs 58 and 59 disposed on opposite sides of the back rest portion 37. Each spring has one end connected to the top of the back rest and the other end connected by a cable arrangement to a rod 60. Using a rotatable handle 61 an operator may drive the rod 60, adjusting the force of the springs (See FIG. 6A).

A modification of the embodiment described above includes an assembly 101 for continuously changing the biasing force provided by the suspension assembly. It applies a force to the seat member S at predetermined intervals at a location outwardly of the center portion of the seat bottom where the cam and follower wheels operate (See FIGS. 11 and 12). This assembly includes a cam wheel 102 and a motor 103 for driving it. It also includes a rod 104 which follows the cam wheel 102, extends through an opening in the support 50 (as does the plunger 52), and drives a spring 105 against the plate 41. The spring 105 lies on the upper end of the rod 104, between the rod and the plate 41. (A further modification includes replacing the primary vibration generating assembly which includes the cam and follower wheels with the assembly 101.)

Turning now to FIGS. 13-15, another modification includes replacing the plate 41 with a double plate assembly 201 which allows lateral displacement, i.e., backward and forward displacement, of the seat member S. This assembly 201 includes a bottom plate 202 pivotally mounted to the base member B at front end in the same manner as plate 41. This plate 202 supports the follower wheel 43 in the same manner that plate 41 supports it and at the same location. It has a channel-like configuration with inwardly extending edge portions. The assembly 201 also includes a top plate 203 having the shape of an inverted channel. This plate 203 lies fixedly secured to the seat member S and includes four rollers 204 which allow it to move laterally with respect to the bottom plate 202. A pair of springs 205 and 206 connect the end portions of the top plate 203 to the middle portion of the bottom plate 202 and bias the plates to the relative positions shown in FIG. 15. A power solenoid 207 jars itself to move the plates relative to each other, and accordingly move or vibrate the seat member S. A spring 208 moves the solenoid plunger back to the position shown in FIG. 15 before the start of each jarring cycle.

While the above description and the drawings illustrate one embodiment and a number of modifications, one should understand, of course, that the invention is not limited to this embodiment. Those skilled in the art to which the invention pertains may make other modifications and other embodiments employing the principals of this invention, particularly upon considering the foregoing teachings. The applicant, therefore, by the appended claims, intends to cover any modifications and other embodiments as incorporate those features which constitute the essential features of this invention.

What is claimed is:

1. A vehicle simulating apparatus comprising: a base member; a seat member pivotally connected to the base member; a rotatable follower mounted to the seat member; and driving means rotatably mounted to the base member proximate the follower for rollingly engaging the follower and displacing the follower between predetermined limits at predetermined time intervals; the seat member being displaced intermittently in response to the movement of the follower and cushioning means disposed between the base member and the seat member for dampening the displacement of the seat member towards the base member.

2. The apparatus of claim 1, wherein the follower includes a follower wheel rotatably mounted to a bottom surface of the seat.

3. The apparatus of claim 2, wherein the lobes are spaced apart equal distances.

4. The apparatus of claim 3, wherein the driving means includes a motor for rotating the wheel.

5. The apparatus of claim 4, wherein the driving means lies proximate the center of the bottom of the seat member.

6. The apparatus of claim 1, wherein the seat member includes biasing spring means disposed in the seat member for biasing the seat away from the base member.

7. The apparatus of claim 1, wherein the driving means generates a vibration frequency within the range of 3-9 Hz for the seat member.

8. The apparatus of claim 1, wherein the base member includes a plurality of wheels for rolling on a subtending supporting surface and moving the base member.

9. The apparatus of claim 1, further comprising a second driving means for displacing the seat member at predetermined time intervals, the second driving means including a cam wheel, a motor for driving the second cam wheel, a rod which follows the second cam wheel and engages it at one of its ends, and a spring disposed on the other end of the rod for engaging the seat member.

10. The apparatus of claim 9, wherein the second driving means applies loads outwardly of the center portion of the bottom of the seat member.

11. A vehicle simulating apparatus comprising: a base member; a seat member pivotally connected to the base member; a rotatable follower mounted to the seat member; drive means including a wheel with a plurality of lobes disposed axially around the wheel means rotatably mounted to the base member proximate the follower for rollingly engaging the follower and displacing the follower between predetermined limits at predetermined time intervals; the seat member being displaced intermittently in response to the movement of the follower; the follower including a follower wheel rotatably mounted to a bottom surface of the seat member; the driving means including a wheel with a plurality of lobes disposed axially on the outer surface of the wheel and spaced apart around the wheel; said lobes displacing the rotatable follower radially of the wheel; means further including a motor for rotating the wheel and cushioning means disposed between the base member and the seat member for dampening the displacement of the seat member towards the base member.

* * * * *